Figure 1:
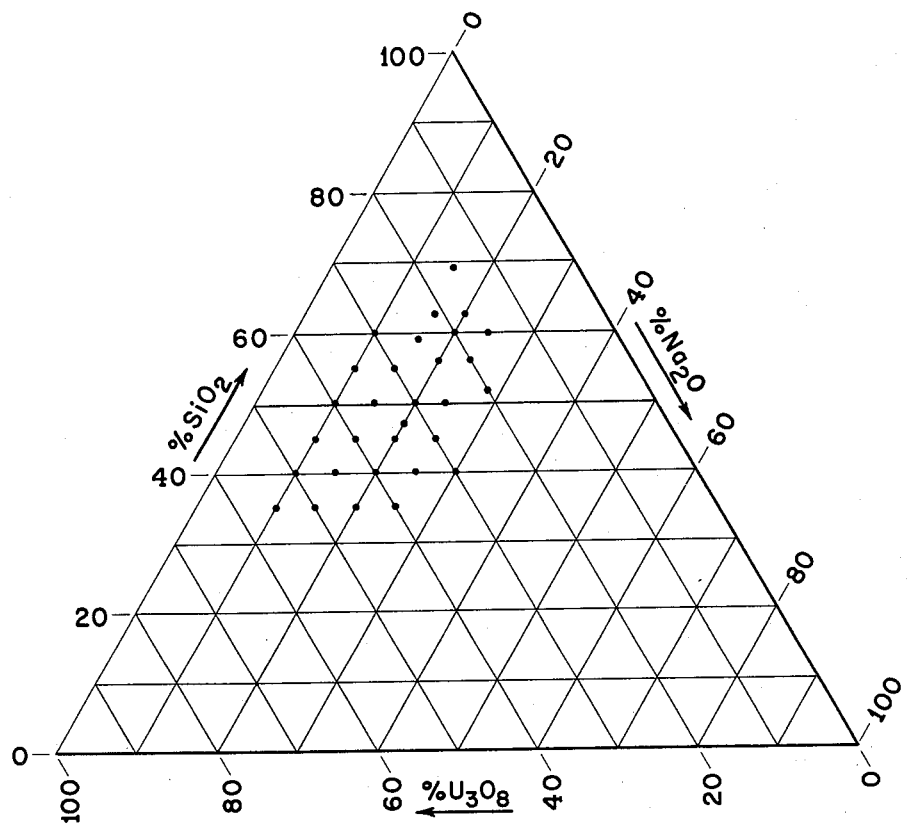

April 2, 1963     R. L. TIEDE     3,084,054

GLASS COMPOSITION

Filed March 15, 1960

INVENTOR.
RALPH L. TIEDE
BY
ATTORNEYS 3,084,054
GLASS COMPOSITION
Ralph L. Tiede, Newark, Ohio; grant to the United States Atomic Energy Commission as the agent of and on behalf of the United States, under the provisions of 42 U.S.C. 2182
Filed Mar. 15, 1960, Ser. No. 15,131
37 Claims. (Cl. 106—52)

This invention relates to glass compositions and more specifically to compositions suitable for fiberizing.

This application is a continuation-in-part of an application having Serial Number 610,897, filed September 20, 1956, and now abandoned.

A great deal of work has been accomplished related to finding specific glass compositions which include uranium oxide as a necessary ingredient, which compositions are especially suited for use in chemical processing and as nuclear fuels. It was earlier recognized that a glass fiber having uranium oxide as an ingredient would be desirable for the above uses; however, the glass compositions having more than 15% uranium oxide have now been discovered and are herein disclosed for the first time.

In order for the compositions to be suitable for use in the production of fibers, they must meet an exacting set of standards. Fiber production, according to present-day high speed methods, requires that a glass melt be produced either from marbles, cullet or from basic raw materials. In either event, a rather substantial amount of molten glass is maintained for discharge in fine streams through orifices in feeders, commonly called bushings, the streams then being attenuated in any of numerous manners into the fine fibers desired. Continuous fibers which are pulled and wound upon a collet winder have been produced from the compositions of the present invention. This process is well-known to all those skilled in the art. The invention herein relates not to process but rather the inventive concept relates directly to the specific compositions which provide the necessary viscosity-temperature relationships to allow fiberization and other physical properties such as durability and strength which have been found desirable by those who use the fibers after they are once produced.

Glass as it is commonly known is a super-cooled liquid and is not in an equilibrium condition. As ordinary glass is heated from room temperature, it passes through a range of temperatures at which it softens, first to a relatively viscous liquid condition. Further heating of glass above the softening range eventually brings it to a liquidus or maximum devitrification temperature. Above the liquidus temperature the glass exists, under equilibrium conditions, as a liquid. Below such temperature, glass exists at equilibrium, in a crystalline state. At temperatures just below the liquidus, devitrification occurs at a rapid rate. Glass to be fiberized must be melted and must also be maintained 100° or so above its liquidus in order to prevent devitrification or even partial devitrification which might occur in the melting tank or in the vicinity of the bushing or feeder if a lower temperature were maintained.

The range of temperatures available in commercial production for fiberization, therefore, is between the liquidus temperature of the glass being fiberized and the maximum permissible operating temperature of the feeder. In order to be suited for the production of glass fibers by commercial techniques, glass must have a liquidus temperature substantially lower than the maximum permissible operating temperature of a feeder which is usually from about 2500° to about 2600° F. and the glass must have a viscosity suitable for fiberization at a temperature above its liquidus temperature but below such maximum bushing operating temperature.

It is an object of this invention to provide glass compositions having a high proportion of uranium oxide as an essential ingredient.

It is a further object to provide compositions of the silica, soda, urania system which are fiberizable by known methods and which can, therefore, be produced economically and commercially.

Further objects will be apparent from the many examples and description which follows.

Glass compositions of the silica, soda, urania system which include from about 15% by weight to about 55% by weight urania are illustrated in the examples which follow.

In the drawing FIGURE 1 represents compositions within the silica-sodium oxide-urania system suitable for the practice of the invention.

These glass compositions have the following ranges of proportions:

|  | Percent |
|---|---|
| $SiO_2$ | 35–70 |
| $Na_2O$ | 5–35 |
| $U_3O_8$ | [1] 15–55 |

[1] Preferably 19–50%.

The following are examples of specific compositions that have been melted and are fiberizable by known techniques.

*Example I*

|  | Percent |
|---|---|
| $SiO_2$ | 34.98 |
| $Al_2O_3$ | .04 |
| $Na_2O$ | 9.99 |
| $U_3O_8$ | 54.97 |
| $Fe_2O_3$ | .02 |

*Example II*

| | |
|---|---|
| $SiO_2$ | 39.98 |
| $Al_2O_3$ | .04 |
| $Na_2O$ | 9.99 |
| $U_3O_8$ | 49.97 |
| $Fe_2O_3$ | .02 |

*Example III*

| | |
|---|---|
| $SiO_2$ | 34.98 |
| $Al_2O_3$ | .04 |
| $Na_2O$ | 14.99 |
| $U_3O_8$ | 49.97 |
| $Fe_2O_3$ | .02 |

*Example IV*

| | |
|---|---|
| $SiO_2$ | 59.95 |
| $Al_2O_3$ | .06 |
| $Na_2O$ | 23.99 |
| $U_3O_8$ | 15.98 |
| $Fe_2O_3$ | .03 |

Bushing operating temperature, 2100–2300° F.
Fiber diameter, .00008–12″.

*Example V*

| | |
|---|---|
| $SiO_2$ | 62.94 |
| $Al_2O_3$ | .06 |
| $Na_2O$ | 19.98 |
| $U_3O_8$ | 16.98 |
| $Fe_2O_3$ | .03 |

Bushing operating temperature, 2300° F.
Fiber diameter, .00018″.

*Example VI*

| | |
|---|---|
| $SiO_2$ | 44.97 |
| $Al_2O_3$ | .05 |
| $Na_2O$ | 9.99 |
| $U_3O_8$ | 44.97 |
| $Fe_2O_3$ | .02 |

Example VII

| | Percent |
|---|---|
| SiO$_2$ | 39.98 |
| Al$_2$O$_3$ | .04 |
| Na$_2$O | 14.99 |
| U$_3$O$_8$ | 44.97 |
| Fe$_2$O$_3$ | .02 |

Example VIII

| | |
|---|---|
| SiO$_2$ | 34.98 |
| Al$_2$O$_3$ | .04 |
| Na$_2$O | 19.99 |
| U$_3$O$_8$ | 44.97 |
| Fe$_2$O$_3$ | .02 |

Example IX

| | |
|---|---|
| SiO$_2$ | 59.95 |
| Al$_2$O$_3$ | .06 |
| Na$_2$O | 9.99 |
| U$_3$O$_8$ | 29.97 |
| Fe$_2$O$_3$ | .03 |

Example X

| | |
|---|---|
| SiO$_2$ | 54.95 |
| Al$_2$O$_3$ | .06 |
| Na$_2$O | 14.99 |
| U$_3$O$_8$ | 29.97 |
| Fe$_2$O$_3$ | .03 |

Example XI

| | |
|---|---|
| SiO$_2$ | 49.96 |
| Al$_2$O$_3$ | .05 |
| Na$_2$O | 19.98 |
| U$_3$O$_8$ | 29.98 |
| Fe$_2$O$_3$ | .03 |

Example XII

| | |
|---|---|
| SiO$_2$ | 44.97 |
| Al$_2$O$_3$ | .05 |
| Na$_2$O | 24.98 |
| U$_3$O$_8$ | 29.98 |
| Fe$_2$O$_3$ | .02 |

Bushing operating temperature, 2200° F.
Fiber diameter, 0.00023".

Example XIII

| | |
|---|---|
| SiO$_2$ | 39.98 |
| Al$_2$O$_3$ | .04 |
| Na$_2$O | 29.98 |
| U$_3$O$_8$ | 29.98 |
| Fe$_2$O$_3$ | .02 |

Bushing operating temperature, 2000° F.
Fiber diameter, 0.00019"

Example XIV

| | |
|---|---|
| SiO$_2$ | 49.96 |
| Al$_2$O$_3$ | .05 |
| Na$_2$O | 9.99 |
| U$_3$O$_8$ | 39.97 |
| Fe$_2$O$_3$ | .03 |

Example XV

| | |
|---|---|
| SiO$_2$ | 44.97 |
| Al$_2$O$_3$ | .05 |
| Na$_2$O | 14.99 |
| U$_3$O$_8$ | 39.97 |
| Fe$_2$O$_3$ | .02 |

Example XVI

| | |
|---|---|
| SiO$_2$ | 39.98 |
| Al$_2$O$_3$ | .04 |
| Na$_2$O | 19.99 |
| U$_3$O$_8$ | 39.98 |
| Fe$_2$O$_3$ | .02 |

Example XVII

| | |
|---|---|
| SiO$_2$ | 34.98 |
| Al$_2$O$_3$ | .04 |
| Na$_2$O | 24.98 |
| U$_3$O$_8$ | 39.98 |
| Fe$_2$O$_3$ | .02 |

Example XVIII

| | Percent |
|---|---|
| SiO$_2$ | 54.95 |
| Al$_2$O$_3$ | .06 |
| Na$_2$O | 9.99 |
| U$_3$O$_8$ | 34.97 |
| Fe$_2$O$_3$ | .03 |

Bushing operating temperature, 2850° F.
Fiber diameter, .00034".

Example XIX

| | |
|---|---|
| SiO$_2$ | 49.96 |
| Al$_2$O$_3$ | .05 |
| Na$_2$O | 14.99 |
| U$_3$O$_8$ | 34.97 |
| Fe$_2$O$_3$ | .03 |

Bushing operating temperature, 2350° F.

Example XX

| | |
|---|---|
| SiO$_2$ | 44.97 |
| Al$_2$O$_3$ | .05 |
| Na$_2$O | 19.99 |
| U$_3$O$_8$ | 34.97 |
| Fe$_2$O$_3$ | .02 |

Example XXI

| | |
|---|---|
| SiO$_2$ | 39.98 |
| Al$_2$O$_3$ | .04 |
| Na$_2$O | 24.98 |
| U$_3$O$_8$ | 34.98 |
| Fe$_2$O$_3$ | .02 |

Bushing operating temperature, 2100° F.
Fiber diameter, .00015".

Example XXII

| | |
|---|---|
| SiO$_2$ | 51.96 |
| Al$_2$O$_3$ | .05 |
| Na$_2$O | 27.98 |
| U$_3$O$_8$ | 19.98 |
| Fe$_2$O$_3$ | .03 |

Bushing operating temperature, 2300° F.
Fiber diameter, .00024".

Example XXIII

| | |
|---|---|
| SiO$_2$ | 55.95 |
| Al$_2$O$_3$ | .06 |
| Na$_2$O | 23.98 |
| U$_3$O$_8$ | 19.98 |
| Fe$_2$O$_3$ | .03 |

Bushing operating temperature, 2050–2300° F.
Fiber diameter, .00008–.00016"

Example XXIV

| | |
|---|---|
| SiO$_2$ | 59.95 |
| Al$_2$O$_3$ | .06 |
| Na$_2$O | 19.98 |
| U$_3$O$_8$ | 19.98 |
| Fe$_2$O$_3$ | .03 |

Bushing operating temperature, 2300° F.
Fiber diameter .00013".

Example XXV

| | |
|---|---|
| SiO$_2$ | 62.94 |
| Al$_2$O$_3$ | .06 |
| Na$_2$O | 15.99 |
| U$_3$O$_8$ | 20.98 |
| Fe$_2$O$_3$ | .03 |

Bushing operating temperature, 2300° F.
Fiber diameter, .00018".

Example XXVI

| | |
|---|---|
| SiO$_2$ | 58.95 |
| Al$_2$O$_3$ | .06 |
| Na$_2$O | 15.99 |
| U$_3$O$_8$ | 24.98 |
| Fe$_2$O$_3$ | .03 |

Bushing operating temperature, 2300° F.
Fiber diameter, .00015".

Example XXVII

| | Percent |
|---|---|
| $SiO_2$ | 55.95 |
| $Al_2O_3$ | .06 |
| $Na_2O$ | 19.98 |
| $U_3O_8$ | 23.98 |
| $Fe_2O_3$ | .03 |

Example XXVIII

| | |
|---|---|
| $SiO_2$ | 49.96 |
| $Al_2O_3$ | .05 |
| $Na_2O$ | 23.98 |
| $U_3O_8$ | 25.98 |
| $Fe_2O_3$ | .03 |

Bushing operating temperature, 2300° F.
Fiber diameter, .00023".

Example XXIX

| | |
|---|---|
| $SiO_2$ | 49.96 |
| $Al_2O_3$ | .05 |
| $Na_2O$ | 9.99 |
| $U_3O_8$ | 34.97 |
| $Fe_2O_3$ | .03 |
| $CaO$ | 5.00 |

Example XXX

| | |
|---|---|
| $SiO_2$ | 46.97 |
| $Al_2O_3$ | .05 |
| $Na_2O$ | 19.99 |
| $U_3O_8$ | 32.98 |
| $Fe_2O_3$ | .02 |

Bushing operating temperature, 2300° F.
Fiber diameter, .00021".

Example XXXI

| | |
|---|---|
| $SiO_2$ | 67.93 |
| $Al_2O_3$ | .07 |
| $Na_2O$ | 15.98 |
| $U_3O_8$ | 15.98 |
| $Fe_2O_3$ | .03 |

Bushing operating temperature, 2200° F.
Fiber diameter, 0.00010".

Example XXXII

| | |
|---|---|
| $SiO_2$ | 39.98 |
| $Al_2O_3$ | 14.99 |
| $Na_2O$ | .02 |
| $U_3O_8$ | 30.00 |
| $Fe_2O_3$ | .02 |
| $MgO$ | 5.00 |
| $CaO$ | 10.00 |

Bushing operating temperature, 2500° F.

The fibers of this composition have good durability.

Example XXXIII

| | Percent |
|---|---|
| $SiO_2$ | 39.98 |
| $Al_2O_3$ | 14.99 |
| $Na_2O$ | .02 |
| $U_3O_8$ | 29.99 |
| $Fe_2O_3$ | .02 |
| $MgO$ | 7.50 |
| $CaO$ | 7.50 |

Bushing operating temperature, 2850° F.

Fibers of this composition have good durability.

Example XXXIV

| | Percent |
|---|---|
| $SiO_2$ | 38.86 |
| $Al_2O_3$ | 7.75 |
| $Na_2O$ | 15.51 |
| $U_3O_8$ | 22.34 |
| $Fe_2O_3$ | .02 |
| $TiO_2$ | 11.63 |
| $ZrO_2$ | 3.89 |

Fibers of this composition have good durability and resistance to water and water vapor.

Example XXXV

| | Percent |
|---|---|
| $SiO_2$ | 51.96 |
| $Al_2O_3$ | .05 |
| $Na_2O$ | 13.99 |
| $U_3O_8$ | 19.98 |
| $Fe_2O_3$ | .03 |
| $K_2O$ | 13.99 |

Example XXXVI

| | |
|---|---|
| $SiO_2$ | 55.82 |
| $Al_2O_3$ | .23 |
| $K_2O$ | 23.92 |
| $U_3O_8$ | 19.94 |
| $Fe_2O_3$ | .09 |

A part or all of the soda can be replaced with potassia as illustrated in Examples XXXV and XXXVI. The compositions of Examples XXXII, XXXIII and XXXIV have an addition of alumina along with the calcia and magnesia or titania and zirconia to provide additional durability over that provided by the silica-urania-soda glass compositions. If very good durability is a prime requisite, these compositions are recommended.

Examples IV, XXIII and XXIX set forth compositions that produced very good fibers which are especially suited for the purposes of this invention. Thus the preferred range for urania appears to be from about 19% to about 50% by weight. Silica, soda and urania are considered essential ingredients in all of these compositions. The alumina and iron oxide are present in only very small amounts as impurities in most of the compositions. The exceptions are Examples XXXII, XXXIII and XXXIV which contain alumina in substantial portions and not as an impurity only. Any other ingredients which are added are not believed to be essential for the purposes outlined in the objectives. These compositions are melted at temperatures of from about 2600–2900° F. The temperature of the glass as it is fiberized is from about 2000–2850° F. The compositions disclosed have been found to be leachable by acid to produce high temperature resistant glass fibers. Example XXXVI when leached with acid curled up quite unexpectedly to provide a novel product.

Modifications and variations within the scope of the appended claims are intended to be included.

I claim:

1. A glass composition consisting essentially of from 35–70% by weight $SiO_2$, from 5–35% by weight $Na_2O$, and from 16–60% by weight $U_3O_8$.

2. Glass composition fiberizable by conventional processes comprising by weight, 34.98% $SiO_2$, 0.04% $Al_2O_3$, 9.99% $Na_2O$, 54.97% $U_3O_8$, and 0.02% $Fe_2O_3$.

3. Glass composition fiberizable by conventional processes comprising by weight, 39.98% $SiO_2$, 0.04% $Al_2O_3$, 9.99% $Na_2O$, 49.97% $U_3O_8$, and 0.02% $Fe_2O_3$.

4. Glass composition fiberizable by conventional processes comprising by weight, 34.98% $SiO_2$, 0.04% $Al_2O_3$, 14.99% $Na_2O$, 49.97% $U_3O_8$, and 0.02% $Fe_2O_3$.

5. Glass composition fiberizable by conventional processes comprising by weight, 59.95% $SiO_2$, 0.06% $Al_2O_3$, 23.99% $Na_2O$, 15.98% $U_3O_8$, and 0.03% $Fe_2O_3$.

6. Glass composition fiberizable by conventional processes comprising by weight, 62.94% $SiO_2$, 0.06% $Al_2O_3$, 19.98% $Na_2O$, 16.98% $U_3O_8$, and 0.03% $Fe_2O_3$.

7. Glass composition fiberizable by conventional processes comprising by weight, 44.97% $SiO_2$, 0.05% $Al_2O_3$, 9.99% $Na_2O$, 44.97% $U_3O_8$, and 0.02% $Fe_2O_3$.

8. Glass composition fiberizable by conventional processes comprising by weight, 39.98% $SiO_2$, 0.04% $Al_2O_3$, 14.99% $Na_2O$, 44.97% $U_3O_8$, and 0.02% $Fe_2O_3$.

9. Glass composition fiberizable by conventional processes comprising by weight, 34.98% $SiO_2$, 0.04% $Al_2O_3$, 19.99% $Na_2O$, 44.97% $U_3O_8$, and 0.02% $Fe_2O_3$.

10. Glass composition fiberizable by conventional processes comprising by weight, 59.95% $SiO_2$, 0.06% $Al_2O_3$, 9.99% $Na_2O$, 29.97% $U_3O_8$, and 0.03% $Fe_2O_3$.

11. Glass composition fiberizable by conventional processes comprising by weight, 54.95% $SiO_2$, 0.06% $Al_2O_3$, 14.99% $Na_2O$, 29.97% $U_3O_8$, and 0.03% $Fe_2O_3$.

12. Glass composition fiberizable by conventional processes comprising by weight, 49.96% $SiO_2$, 0.05% $Al_2O_3$, 19.98% $Na_2O$, 29.98% $U_3O_8$, and 0.03% $Fe_2O_3$.

13. Glass composition fiberizable by conventional processes comprising by weight, 44.97% $SiO_2$, 0.05% $Al_2O_3$, 24.98% $Na_2O$, 29.98% $U_3O_8$, and 0.02% $Fe_2O_3$.

14. Glass composition fiberizable by conventional processes comprising by weight, 39.98% $SiO_2$, 0.04% $Al_2O_3$, 29.98% $Na_2O$, 29.98% $U_3O_8$, and 0.02% $Fe_2O_3$.

15. Glass composition fiberizable by conventional processes comprising by weight, 49.96% $SiO_2$, 0.05% $Al_2O_3$, 9.99% $Na_2O$, 39.97% $U_3O_8$, and 0.03% $Fe_2O_3$.

16. Glass composition fiberizable by conventional processes comprising by weight, 44.97% $SiO_2$, 0.05% $Al_2O_3$, 14.99% $Na_2O$ 39.97% $U_3O_8$, and 0.02% $Fe_2O_3$.

17. Glass composition fiberizable by conventional processes comprising by weight, 39.98% $SiO_2$, 0.04% $Al_2O_3$, 14.99% $Na_2O$, 39.98% $U_3O_8$, and 0.02% $Fe_2O_3$.

18. Glass composition fiberizable by conventional processes comprising by weight, 34.98% $SiO_2$, 0.04% $Al_2O_3$, 24.98% $Na_2O$, 39.98% $U_3O_8$, and 0.02% $Fe_2O_3$.

19. Glass composition fiberizable by conventional processes comprising by weight, 54.95% $SiO_2$, 0.06% $Al_2O_3$, 9.99% $Na_2O$, 34.97% $U_3O_8$, and 0.03% $Fe_2O_3$.

20. Glass composition fiberizable by conventional processes comprising by weight, 49.96% $SiO_2$, 0.05% $Al_2O_3$, 14.99% $Na_2O$, 34.97% $U_3O_8$, and 0.03% $Fe_2O_3$.

21. Glass composition fiberizable by conventional processes comprising by weight, 44.97% $SiO_2$, 0.05% $Al_2O_3$, 19.99% $Na_2O$, 34.97% $U_3O_8$, and 0.02% $Fe_2O_3$.

22. Glass composition fiberizable by conventional processes comprising by weight, 39.98% $SiO_2$, 0.04% $Al_2O_3$, 24.98% $Na_2O$, 34.98% $U_3O_8$, and 0.02% $Fe_2O_3$.

23. Glass composition fiberizable by conventional processes comprising by weight, 51.96% $SiO_2$, 0.05% $Al_2O_3$, 27.98% $Na_2O$, 19.98% $U_3O_8$, and 0.03% $Fe_2O_3$.

24. Glass composition fiberizable by conventional processes comprising by weight, 55.95% $SiO_2$, 0.06% $Al_2O_3$, 23.98% $Na_2O$, 19.98% $U_3O_8$, and 0.03% $Fe_2O_3$.

25. Glass composition fiberizable by conventional processes comprising by weight, 59.95% $SiO_2$, 0.06% $Al_2O_3$, 19.98% $Na_2O$, 19.98% $U_3O_8$, and 0.03% $Fe_2O_3$.

26. Glass composition fiberizable by conventional processes comprising by weight, 62.94% $SiO_2$, 0.06% $Al_2O_3$, 15.99% $Na_2O$, 20.98% $U_3O_8$, and 0.03% $Fe_2O_3$.

27. Glass composition fiberizable by conventional processes comprising by weight, 58.95% $SiO_2$, .006% $Al_2O_3$, 15.99% $Na_2O$, 24.98% $U_3O_8$, and 0.03% $Fe_2O_3$.

28. Glass composition fiberizable by conventional processes comprising by weight, 55.95% $SiO_2$, 0.06% $Al_2O_3$, 19.98% $Na_2O$, 23.98% $U_3O_8$, and 0.03% $Fe_2O_3$.

29. Glass composition fiberizable by conventional processes comprising by weight, 49.96% $SiO_2$, 0.05% $Al_2O_3$, 23.98% $Na_2O$, 25.98% $U_3O_8$, and 0.03% $Fe_2O_3$.

30. Glass composition fiberizable by conventional processes comprising by weight, 49.96% $SiO_2$, 0.05% $Al_2O_3$, 9.99% $Na_2O$, 34.97% $U_3O_8$, 0.03% $Fe_2O_3$, and 5.00% $CaO$.

31. Glass composition fiberizable by conventional processes comprising by weight, 46.97% $SiO_2$, 0.05% $Al_2O_3$, 19.99% $Na_2O$, 32.98% $U_3O_8$, and 0.02% $Fe_2O_3$.

32. Glass composition fiberizable by conventional processes comprising by weight, 67.93% $SiO_2$, 0.07% $Al_2O_3$, 15.98% $Na_2O$, 15.98% $U_3O_8$, and 0.03% $Fe_2O_3$.

33. Glass composition fiberizable by conventional processes comprising by weight, 39.98% $SiO_2$, 14.99% $Al_2O_3$, 0.02% $Na_2O$, 30.00% $U_3O_8$, 0.02% $Fe_2O_3$, 5.00% $MgO$, and 10.00% $CaO$.

34. Glass composition fiberizable by conventional processes comprising by weight, 39.98% $SiO_2$, 14.99% $Al_2O_3$, 0.02% $Na_2O$, 29.99% $U_3O_8$, 0.02% $Fe_2O_3$, 7.50% $MgO$, and 7.50% $CaO$.

35. Glass composition fiberizable by conventional processes comprising by weight, 38.86% $SiO_2$, 7.75% $Al_2O_3$, 15.51% $Na_2O$, 22.34% $U_3O_8$, 0.02% $Fe_2O_3$, 11.63% $TiO_2$, and 3.89% $ZrO_2$.

36. Glass composition fiberizable by conventional processes comprising by weight, 51.96% $SiO_2$, 0.05% $Al_2O_3$, 13.99% $Na_2O$, 19.98% $U_3O_8$, 0.03% $Fe_2O_3$, and 13.99% $K_2O$.

37. Glass composition fiberizable by conventional processes comprising by weight, 55.82% $SiO_2$, 0.23% $Al_2O_3$, 23.92% $K_2O$, 19.94% $U_3O_8$, and 0.09% $Fe_2O_3$.

References Cited in the file of this patent

UNITED STATES PATENTS 2,928,780     Harteck et al. _____ Mar. 15, 1960

FOREIGN PATENTS 793,866     Great Britain _____ Apr. 23, 1958

OTHER REFERENCES

Mellor: Treatise on Inorg. and Org. Chemistry, vol. 12, page 45.